(12) United States Patent
McNall et al.

(10) Patent No.: US 9,784,412 B2
(45) Date of Patent: Oct. 10, 2017

(54) ADJUSTABLE CYLINDER BRACKET

(71) Applicant: American Air Liquide, Inc., Fremont, CA (US)

(72) Inventors: Monaca McNall, Newark, DE (US); Scott Liedel, Bear, DE (US); Robert Sokola, Neward, DE (US); Bryan R. Hotaling, Acton, MA (US); John A. MacNeill, Acton, MA (US); James M. Ormond, Acton, MA (US); James R. Varney, Acton, MA (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 15/220,658

(22) Filed: Jul. 27, 2016

(65) Prior Publication Data

US 2017/0241594 A1 Aug. 24, 2017

Related U.S. Application Data

(60) Provisional application No. 62/298,863, filed on Feb. 23, 2016.

(51) Int. Cl.
*B62B 3/06* (2006.01)
*F17C 13/08* (2006.01)
*F16M 13/02* (2006.01)
*F16M 11/04* (2006.01)
*B62B 3/10* (2006.01)

(52) U.S. Cl.
CPC .......... *F17C 13/085* (2013.01); *B62B 3/0606* (2013.01); *B62B 3/104* (2013.01); *F16M 11/041* (2013.01); *F16M 13/02* (2013.01); *F17C 2201/0104* (2013.01); *F17C 2201/056* (2013.01); *F17C 2205/0161* (2013.01); *F17C 2270/01* (2013.01)

(58) Field of Classification Search
CPC .............. F17C 13/084; F17C 13/085; F17C 2205/0153; F17C 2205/0157; F17C 2205/0161; B62B 3/0606; B62B 3/06; B62B 3/04; B62B 3/104; F16M 11/041; F16M 13/02
USPC .................................................... 280/47.131
See application file for complete search history.

(56) References Cited

U.S. PATENT DOCUMENTS

| | | |
|---|---|---|
| 4,109,692 A | 8/1978 | Brown |
| 4,632,575 A | 12/1986 | Alverth et al. |
| 4,852,465 A | 8/1989 | Rosengren |
| 4,860,986 A * | 8/1989 | Couzens ............... B60N 3/103 248/310 |
| 5,100,007 A | 3/1992 | Espasandin et al. |
| 5,210,901 A | 5/1993 | Cooper |
| 5,658,118 A | 8/1997 | Luca |
| 6,220,557 B1 | 4/2001 | Ziaylek et al. |
| 6,224,071 B1 | 5/2001 | Dummer |
| 6,368,048 B2 | 4/2002 | Womble et al. |

(Continued)

*Primary Examiner* — John Walters
(74) *Attorney, Agent, or Firm* — Elwood L. Haynes

(57) ABSTRACT

A cylinder transport and mounting system is provided. This system includes a object mounting yoke, and at least one bracket selected from the group consisting of a conveyance mounting bracket, and user mounting bracket, wherein the cylinder mounting yoke is configured to attach securely to a cylinder and to detachably interface with the conveyance mounting bracket and/or to detachably interface with the user mounting bracket.

25 Claims, 16 Drawing Sheets

(56) References Cited

U.S. PATENT DOCUMENTS

| | | |
|---|---|---|
| 7,131,618 B2 | 11/2006 | Berry et al. |
| 7,370,660 B2 * | 5/2008 | Hamilton .................. A61H 3/04 |
| | | 135/66 |
| 8,220,764 B2 | 7/2012 | Ziaylek |
| 8,262,106 B1 * | 9/2012 | Suszynsky .............. B62B 5/002 |
| | | 280/47.131 |
| 8,262,108 B2 | 9/2012 | Al-Hasan |

* cited by examiner

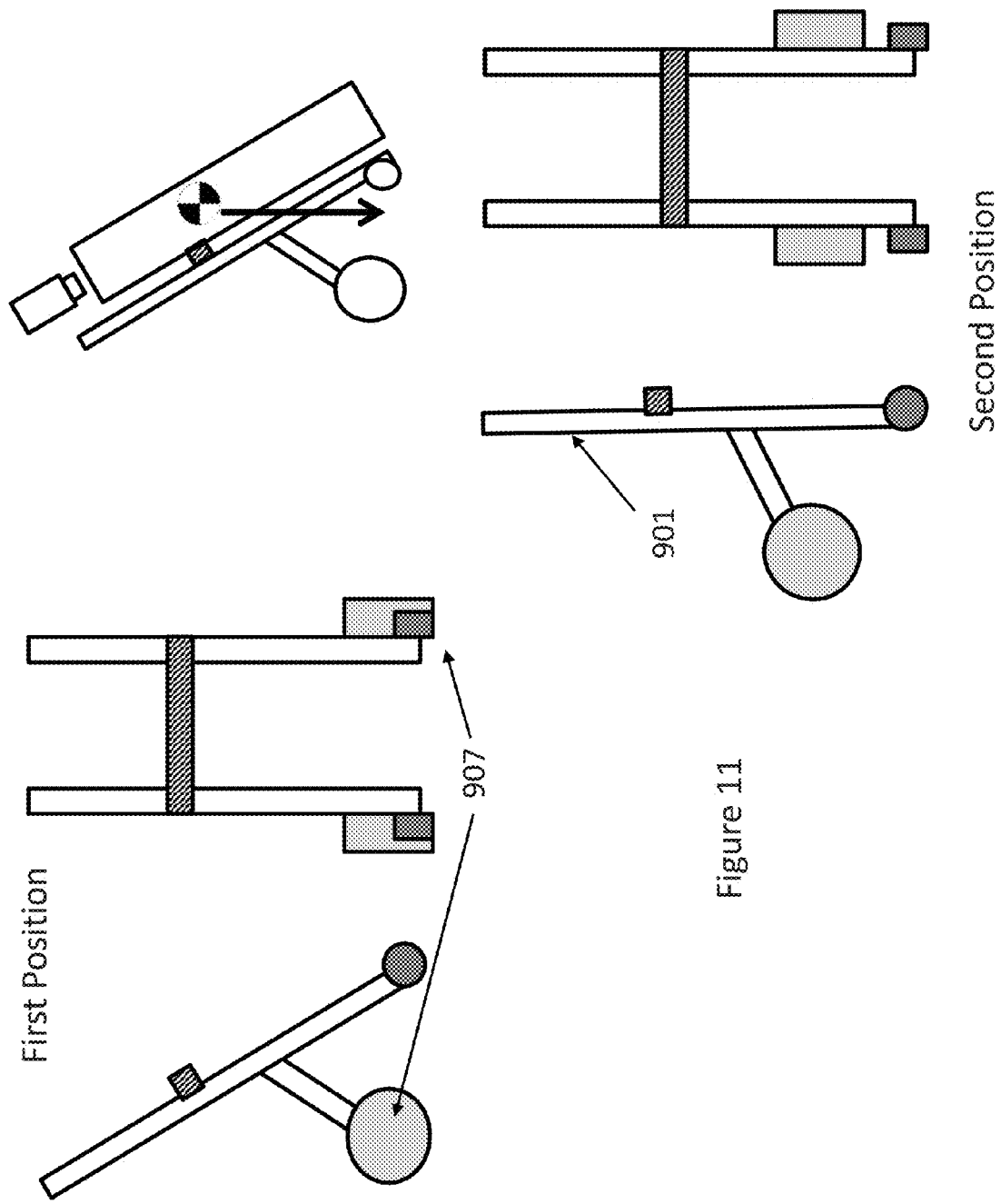

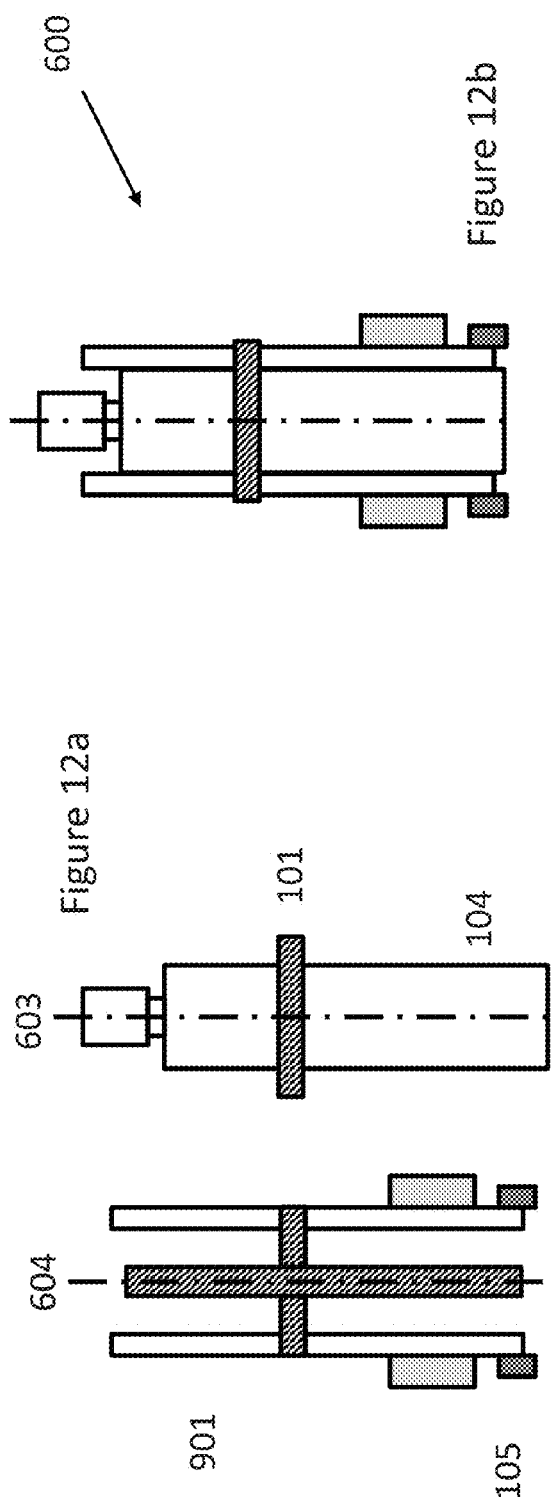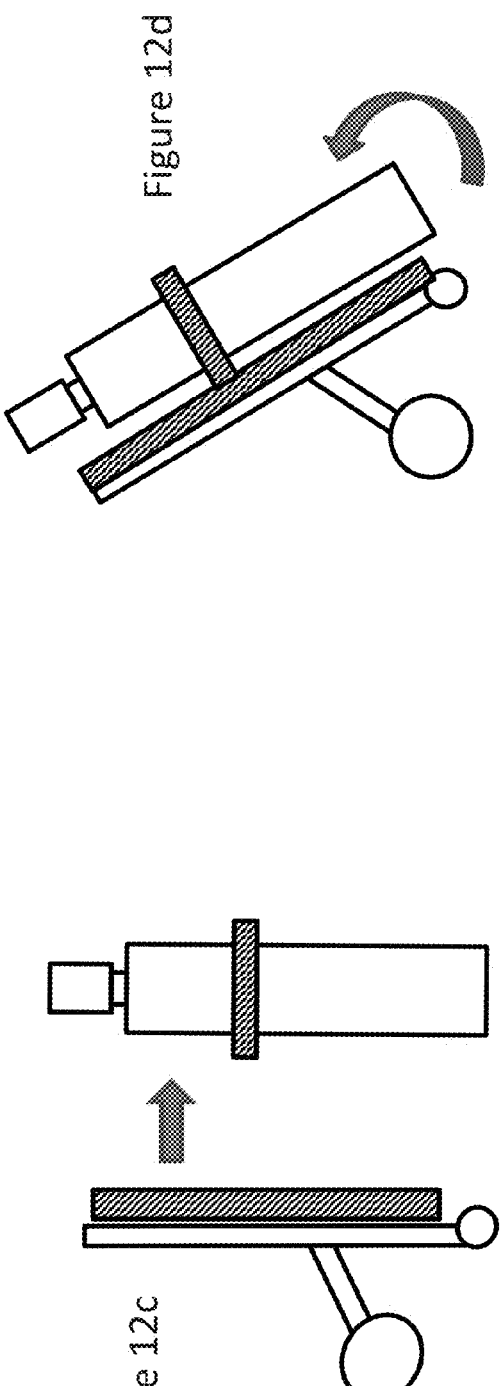

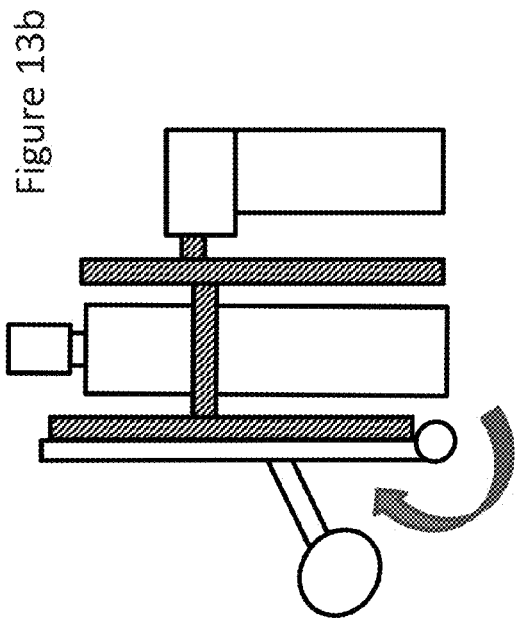
Figure 13b
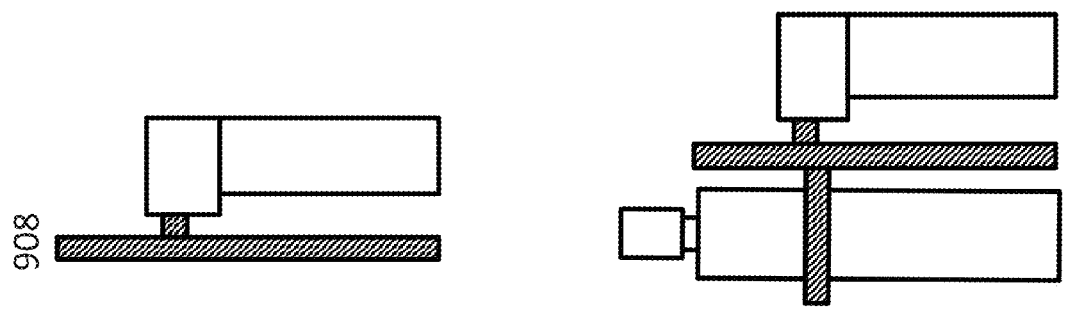
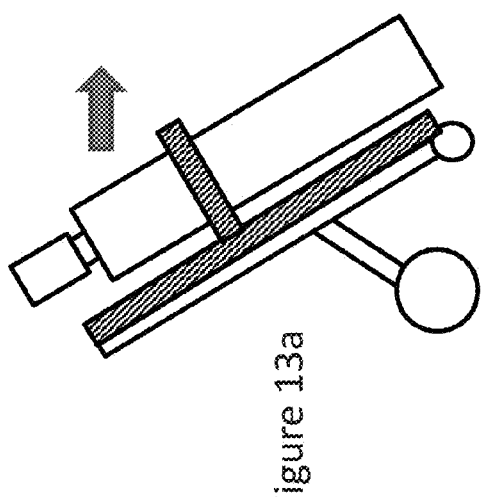
Figure 13a
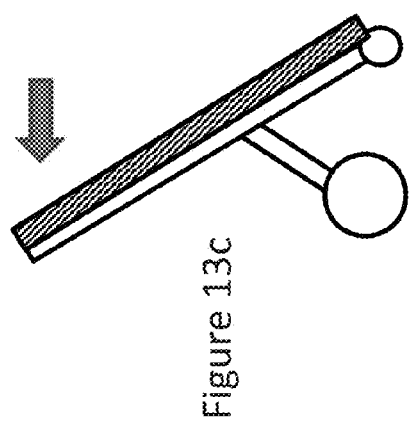
Figure 13c

ADJUSTABLE CYLINDER BRACKET

CROSS REFERENCE TO RELATED APPLICATIONS

This application claims the benefit under 35 U.S.C. §119(e) provisional application No. 62/298,863 filed Feb. 23, 2016, the entire contents of each being incorporated herein by reference.

BACKGROUND

Heavy objects, in particular compressed gas cylinders, are moved around and secured in various locations every day. Safely securing those objects to a cart and to the location of use is critical for safe handling and use. Lifting the smaller cylinders to bench-top height for proximity to analytical instruments can also be an ergonomic and safety issue.

Although many types of cylinder carts are commercially available, most are designed for moving cylinders of size 30AL or larger and do not easily transport shorter and/or narrower cylinders as well. Furthermore, having to manually transfer the object between two devices, the (cylinder) cart and the point of use, adds time and reduces safety in cylinder handling. Finally, the user currently does not have a single device which can be used to both move a cylinder and secure the cylinder for use.

SUMMARY

A transport and mounting system is provided. This system includes an object mounting yoke, and at least one bracket selected from the group consisting of a conveyance mounting bracket, and user mounting bracket, wherein the cylinder mounting yoke is configured to attach securely to a cylinder and to detachably interface with the conveyance mounting bracket and/or to detachably interface with the user mounting bracket.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein:

FIG. 11, illustrates the first position and the second position of the transport device, in accordance with one embodiment of the present invention.

FIGS. 12a-12d illustrate the method for attaching the transport device to the cylinder, in accordance with one embodiment of the present invention.

FIGS. 13a-13c illustrate the method of detaching the cylinder from the transport device and attaching it to the workspace, in accordance with one embodiment of the present invention.

DETAILED DESCRIPTION

Figure 1:
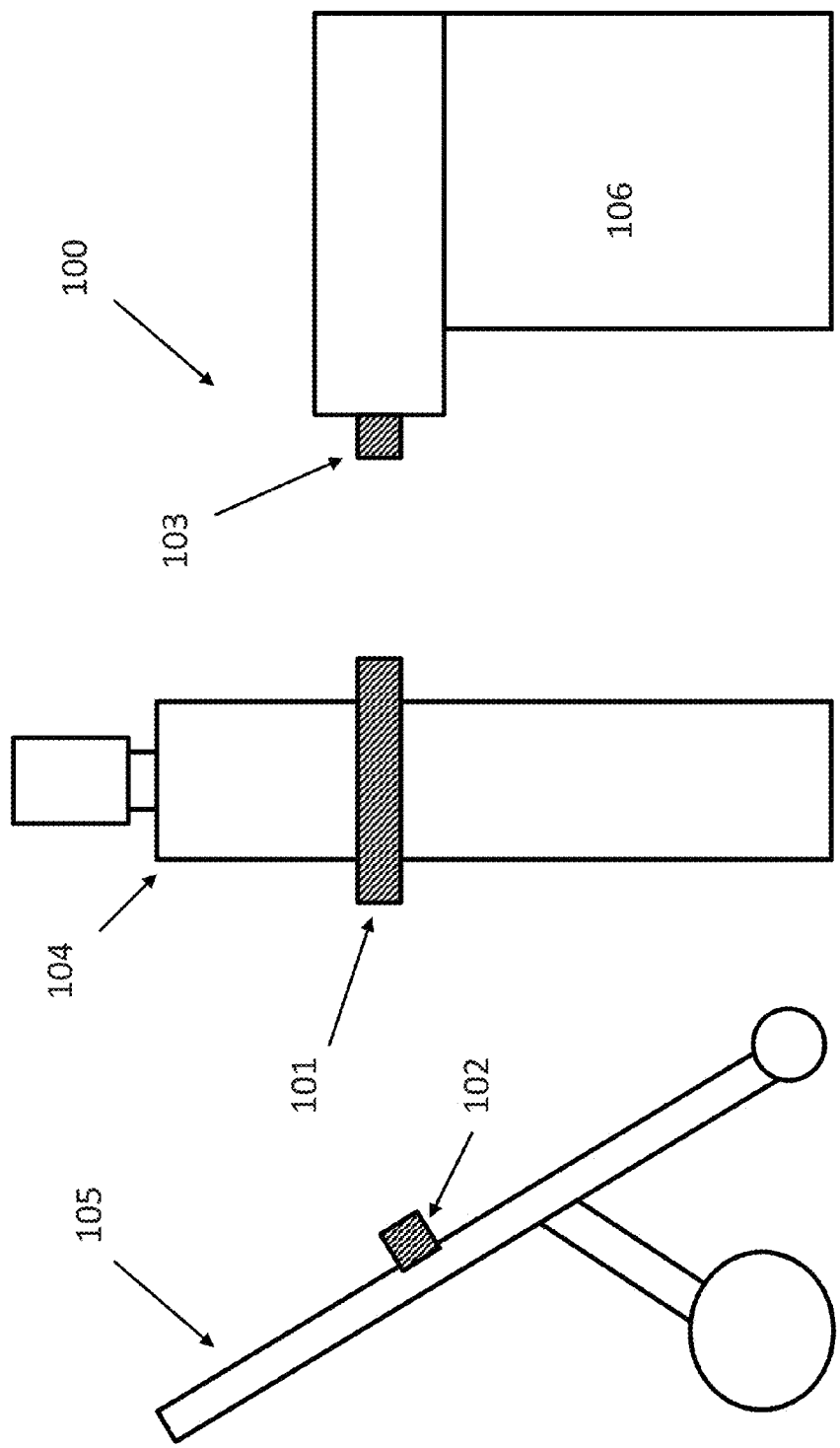
FIG. 1 illustrates a system incorporating a conveyance mounting bracket, an object mounting yoke, and a user mounting bracket, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In one embodiment of the current invention one device is provided which both transports and secures gas cylinders of a variety of heights and widths, for example cylinders sized 16 liters and 150 pounds or less. The invention can also apply to objects other than cylinders which fit within the devices securely.

One unique feature of the current system is in the adjustability of the cylinder support system in the dimensions of the cylinders it supports. Another other unique feature of this system is the capability to be both mobile and securely mounted for storage or use.

Several features of the invention are unique in comparison to products currently on the market and are not part of the current state of the art.

Figure 14:
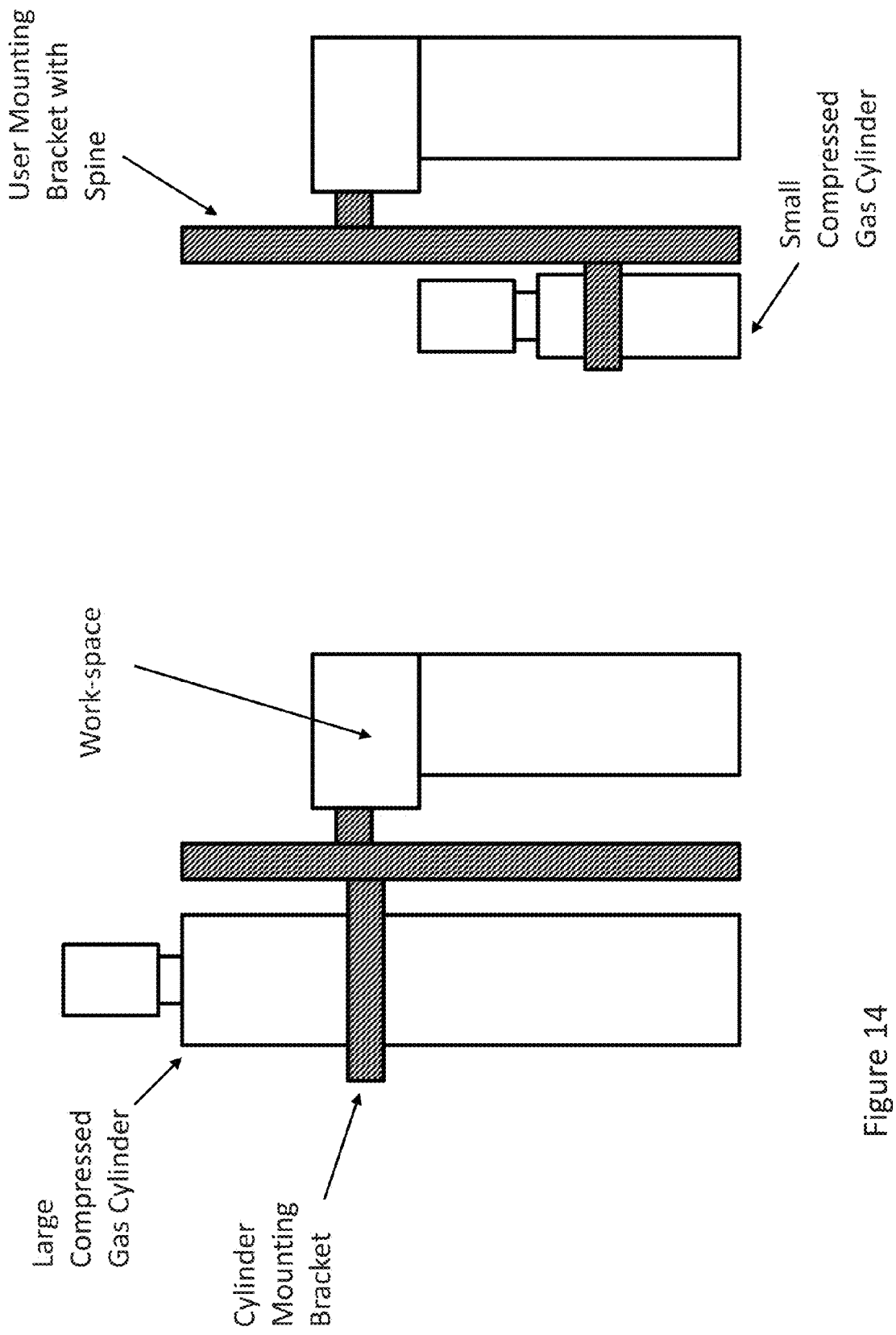
FIG. 14 illustrates various embodiments of the present invention.
Figure 15:
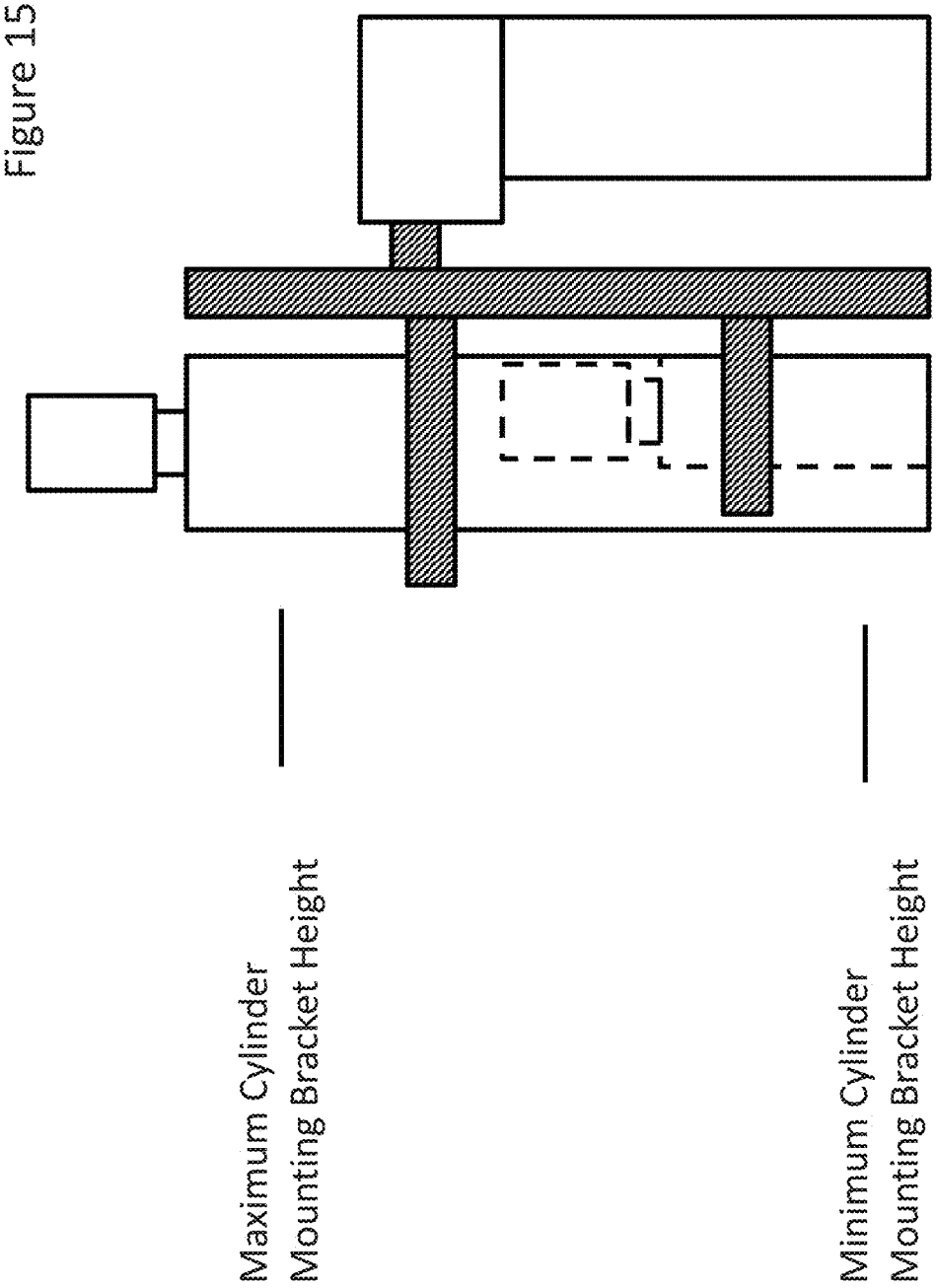
FIG. 15 illustrates another embodiment of the present invention.

First, currently the location of strap for securing the object is fixed, either to a bench top or to a bar. With no adjustability in height, if the object is a less common size or height, it may not be able to be secured safely, if at all. Especially for smaller cylinders, instability can become an issue when gas delivery equipment is connected. Freestanding devices which do exist, such as the cage style cylinder holder, tip over on the addition of a two-stage regulator and tubing, creating a safety hazard if the cylinder is at high pressure. The present system allows an object of variable height, width or shape to be secured and safely used as illustrated in FIGS. 14 and 15. The system is infinitely adjustable, and can be adjusted to any point between the Maximum Object mounting yoke Height and the Minimum Object mounting yoke Height.

Second, the current method of transporting then securing cylinders requires attaching the cylinder to the cart, moving the cylinder to the destination, detaching the cylinder from the cart, manually moving the cylinder from the cart to the location of use, then re-securing the cylinder with a second strapping device. With any manual activity involving cylinders, there is a potential for injury to the operator, for example back injury, or pinching of hands or feet. The system described herein eliminates manual transfer from cart to cylinder bracket. A single strap remains with the cylinder at all times. That strap contains a device which can connect either to the bracket or to the cart. The cylinder strap, cart and bracket are integrated in a way to provide direct transfer. For example, the user could clip onto the bracket before unclipping from the cart, or the cart can be directly attached to a surface, as illustrated in FIGS. 12 and 13.

Additionally, the wheels of the invention may be folded up to minimize space usage if it is desired to leave the cart with the bracket permanently. Integrating the cart with the bracket eliminates the need for storage of cylinder carts.

Figure 16:
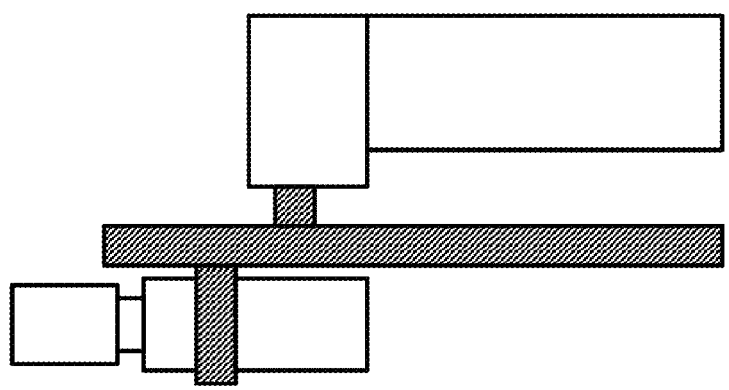
FIG. 16 illustrates another embodiment of the present invention.

Third, there is no product on the market which can hold cylinders in an elevated position. There are currently no brackets permanently hold the cylinders in a raised position. Many operators are forced to use stools, boxes or chairs to prop up the small cylinders to reach bench-top height. The present system would provide the option for the bracket to hold small cylinders at raised positions, as illustrated in FIG. 16.

LIST OF ELEMENT NUMBERS

101=object mounting yoke
102=conveyance mounting bracket
103=user mounting bracket
104=cylinder
105=transport device
106=workspace
201=cylinder mounting spine
301=user mounting spine
401=conveyance mounting spine
601=first cylinder mounting spine
602=second cylinder mounting spine
603=axial centerline (of cylinder 104)
604=first centerline (of elongated bearing beam 901)
605=second centerline (of elongated bearing beam 901)
701=outside diameter (of cylinder 104)
702=clamping member (of object mounting yoke 101)
703=first side (of clamping member 702)
704=second side (of clamping member 702)
705=pins (of clamping member 702)
801=securing means (for clamping member 702)
802=fastening apparatus (for clamping member 702)
901=elongated load bearing beam
902=release arm (for elongated load bearing beam 901)
903=one end of elongated load bearing beam 901
904=slots on the sides of elongated load bearing beam 901
905=sides of elongated load bearing beam 901
906=release bars (for elongated load bearing beam 901)
907=four wheels (on transport device 105)
908=second elongated load bearing beam Turning now to FIG. 1, in one embodiment of the present invention, a cylinder transport and mounting system 100 is provided. This system 100 includes an object mounting yoke 101, and at least one bracket selected from the group consisting of a conveyance mounting bracket 102, and user mounting bracket 103. The object mounting yoke 101 is configured to attach securely to a cylinder 104 and to detachably interface with the conveyance mounting bracket 102 and/or to detachably interface with the user mounting bracket 103.

The conveyance mounting bracket 102 may be configured to attach securely to a transport device 105 and to detachably interface with the object mounting yoke 101. The user mounting bracket 103 may be configured to attach securely to a workspace 106 and to detachably interface with the object mounting yoke 101. The conveyance mounting bracket 102 may be removably attached (by, for example, welding) or permanently attached (by, for example, bolting) to the transport device.

Figure 2:
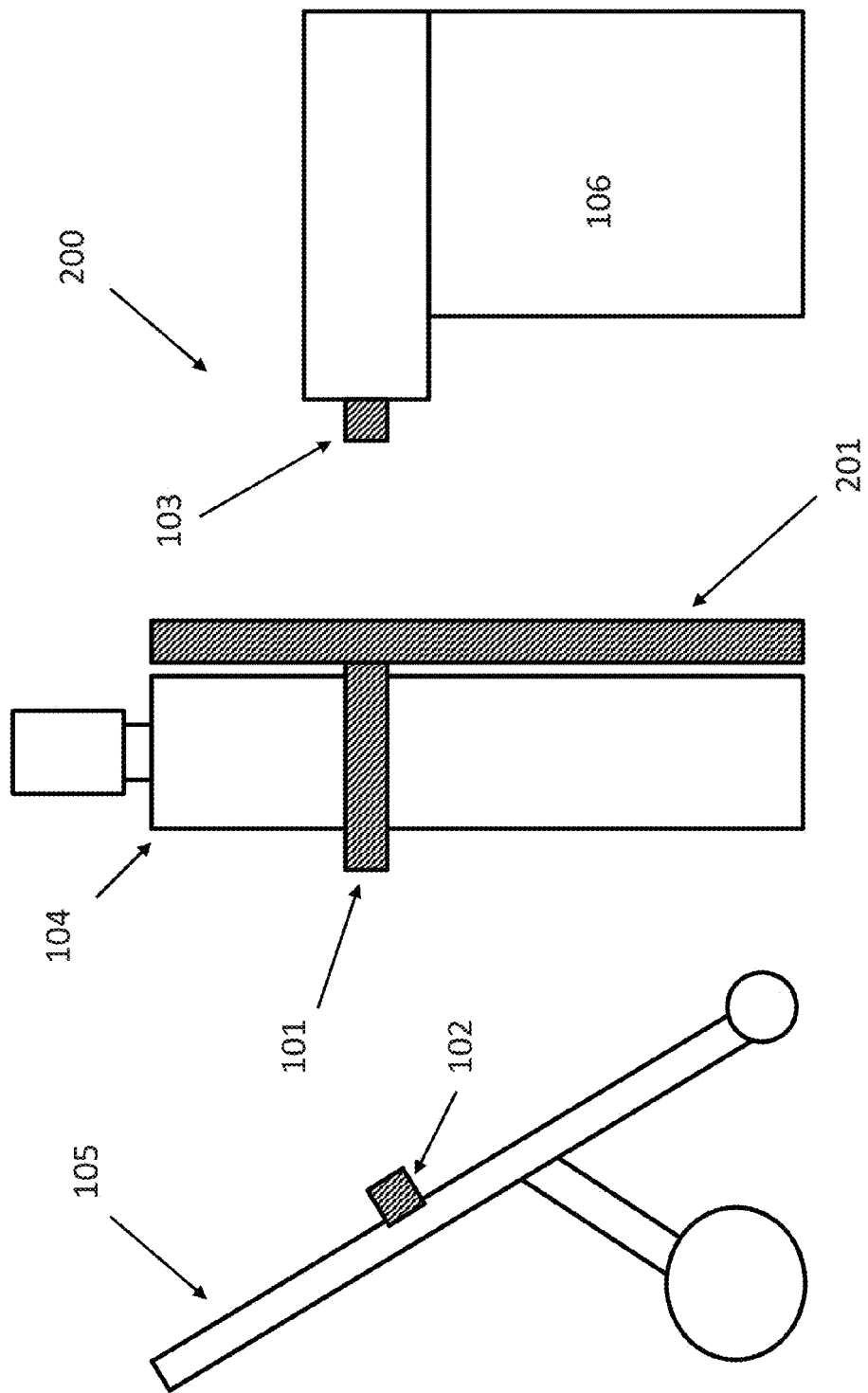
FIG. 2 illustrates a system incorporating a conveyance mounting bracket, a cylinder mounting spine, an object mounting yoke, and a user mounting bracket, in accordance with one embodiment of the present invention.

Turning to FIG. 2, in another embodiment of the current invention, a cylinder transport and mounting system 200 is provided. In the interest of avoiding ambiguity, all figures are consistent in their use of element numbers. This system 200 includes a object mounting yoke 101, which includes a cylinder mounting spine 201. System 200 includes a conveyance mounting bracket 102, and user mounting bracket 103. The conveyance mounting bracket 102 may be configured to attach securely to a transport device 105. The user mounting bracket 103 may be configured to attach securely to a workspace. The object mounting yoke 101 is configured to attach securely to a cylinder 104. The cylinder mounting spine 201 is configured to attach securely to the object mounting yoke 101 and to removably attach to the user mounting bracket 103. The object mounting yoke 101 is configured to detachably interface with the conveyance mounting bracket 102.

Figure 3:
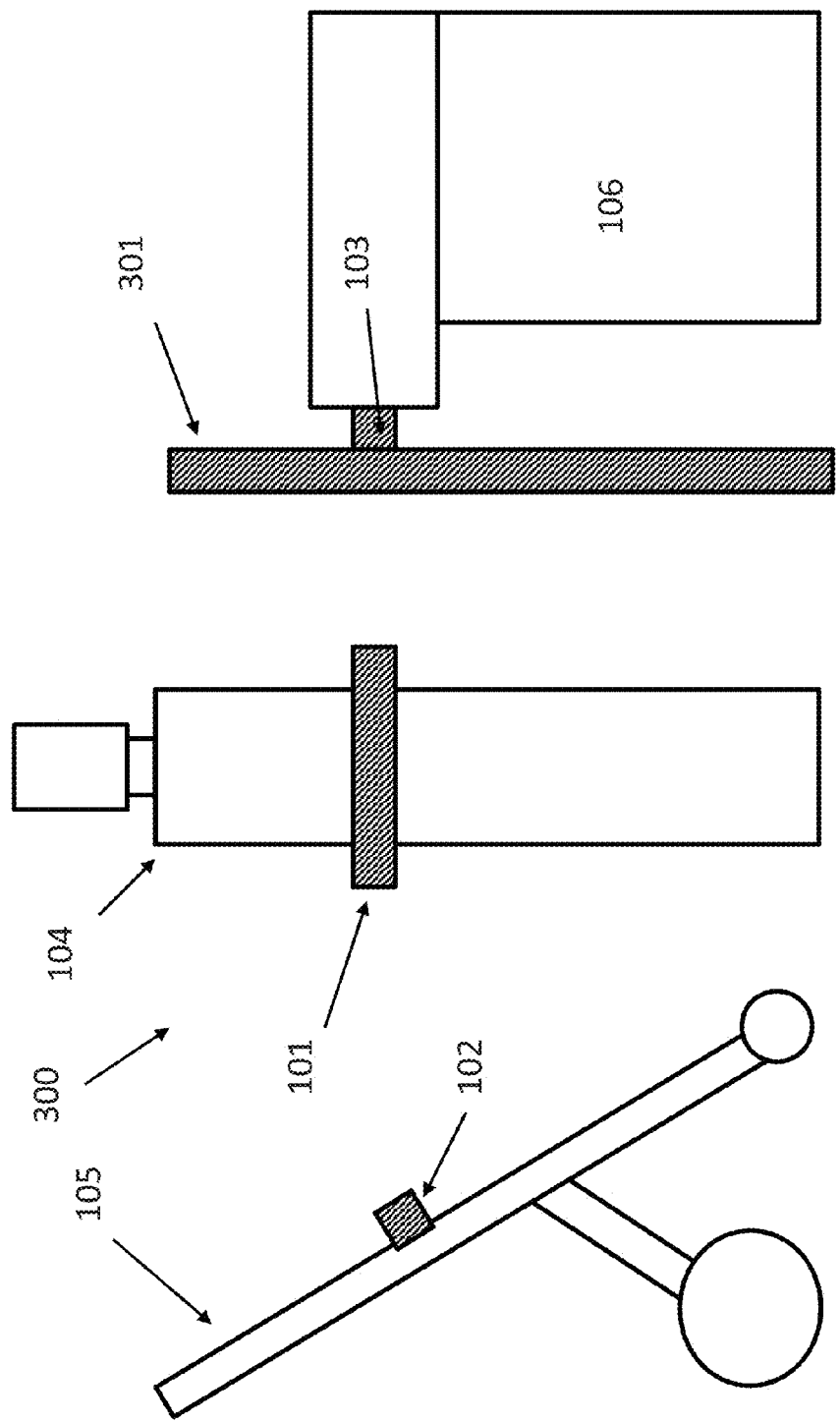
FIG. 3 illustrates a system incorporating a conveyance mounting bracket, a user mounting spine, an object mounting yoke, and a user mounting bracket, in accordance with one embodiment of the present invention.

Turning to FIG. 3, in another embodiment of the current invention, a cylinder transport and mounting system 300 is provided. This system 300 includes a object mounting yoke 101. System 300 includes a conveyance mounting bracket 102 and user mounting bracket 103. The conveyance mounting bracket 102 may be configured to attach securely to a transport device 105. The user mounting bracket 103 may be configured to attach securely to a workspace 106. The object mounting yoke 101 is configured to attach securely to a cylinder 104. A user mounting spine 301 is configured to attach securely to the user mounting bracket 103 and to removably attach to the object mounting yoke 101. The object mounting yoke 101 is configured to detachably interface with the conveyance mounting bracket 102.

Figure 4:
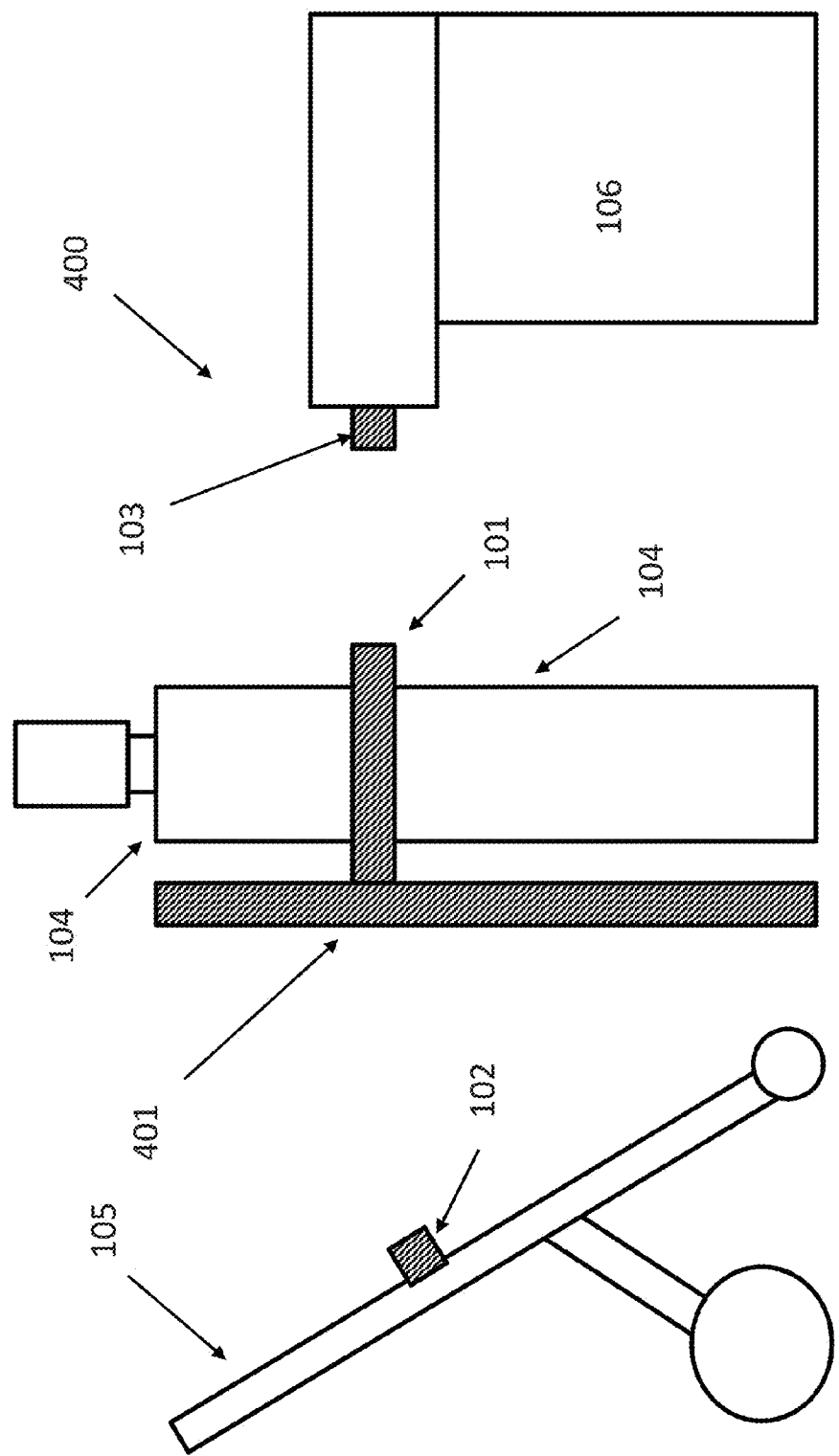
FIG. 4 illustrates a system incorporating a conveyance mounting bracket, a conveyance mounting spine, an object mounting yoke, and a user mounting bracket, in accordance with one embodiment of the present invention.

Turning to FIG. 4, in another embodiment of the current invention, a cylinder transport and mounting system 400 is provided. This system 400 includes a object mounting yoke 101. System 400 includes a conveyance mounting bracket 102, a conveyance mounting spine 401, and user mounting bracket 103. The user mounting bracket 103 may be configured to attach securely to a workspace 106. The object mounting yoke 101 is configured to attach securely to a cylinder 104. The conveyance mounting bracket 102 may be configured to attach securely to a transport device 105. The conveyance mounting spine 401 is configured to attach securely to the object mounting yoke 101 and to removably attach to the conveyance mounting bracket 102.

Figure 5:
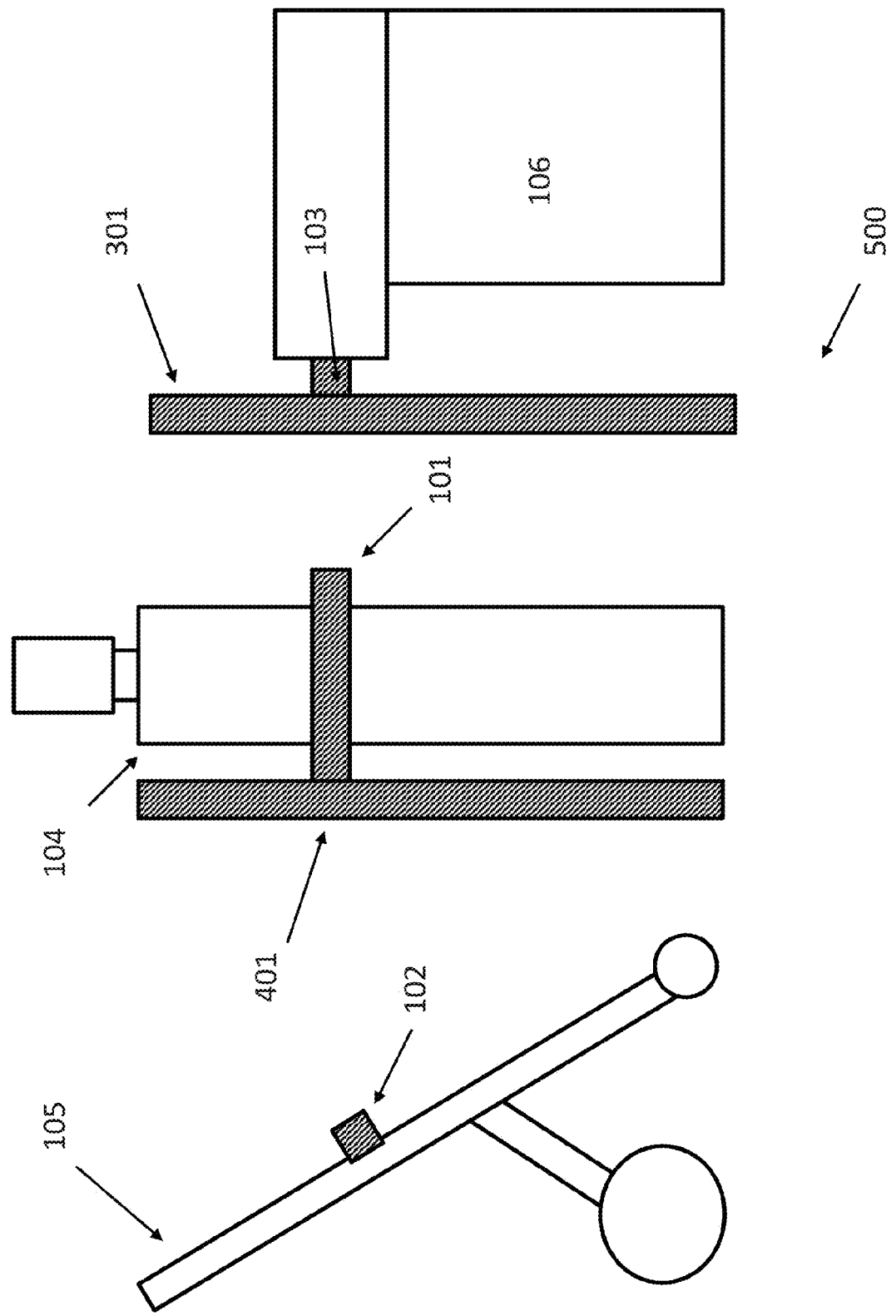
FIG. 5 illustrates a system incorporating a conveyance mounting bracket, a conveyance mounting spine, a user mounting spine, an object mounting yoke, and a user mounting bracket, in accordance with one embodiment of the present invention.

Turning to FIG. 5, in another embodiment of the current invention, a cylinder transport and mounting system 500 is provided. This system 500 includes a object mounting yoke 101. System 500 includes a conveyance mounting bracket 102, a conveyance mounting spine 401, user mounting spine 301, and user mounting bracket 103. The user mounting bracket 103 may be configured to attach securely to a workspace 106. The object mounting yoke 101 is configured to attach securely to a cylinder 104. The conveyance mounting bracket 102 may be configured to attach securely to a transport device 105. The conveyance mounting spine 401 is configured to attach securely to the object mounting yoke 101 and to removably attach to the conveyance mounting bracket 102. The user mounting spine 301 is configured to attach securely to the user mounting bracket 103 and to removably attach to the object mounting yoke 101.

Figure 6:
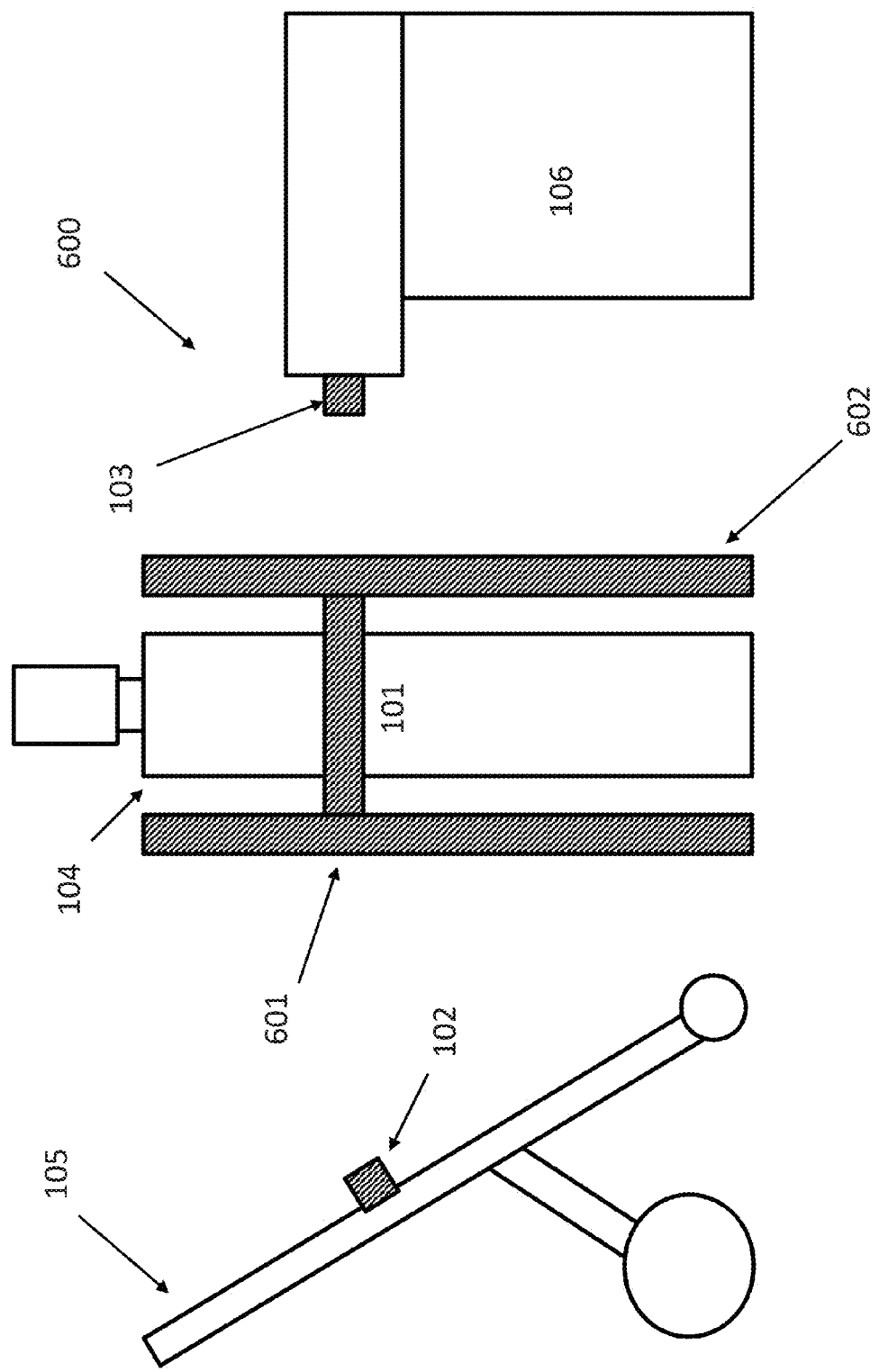
FIG. 6 illustrates a system incorporating a conveyance mounting bracket, a first cylinder mounting spine, a second cylinder mounting spine, an object mounting yoke, and a user mounting bracket, in accordance with one embodiment of the present invention.

Turning to FIG. 6, in another embodiment of the current invention, a cylinder transport and mounting system 600 is provided. This system 600 includes a object mounting yoke 101. System 600 includes a conveyance mounting bracket 102, a first cylinder mounting spine 601, second cylinder mounting spine 602, and user mounting bracket 103. The user mounting bracket 103 may be configured to attach securely to a workspace 106. The object mounting yoke 101 is configured to attach securely to a cylinder 104. The conveyance mounting bracket 102 may be configured to attach securely to a transport device 105. The first cylinder mounting spine 601 is configured to attach securely to the object mounting yoke 101 and to removably attach to the conveyance mounting bracket 102. The second cylinder mounting spine 602 is configured to attach securely to the object mounting yoke 101, and to removably attach to the user mounting bracket 103.

Figure 7:
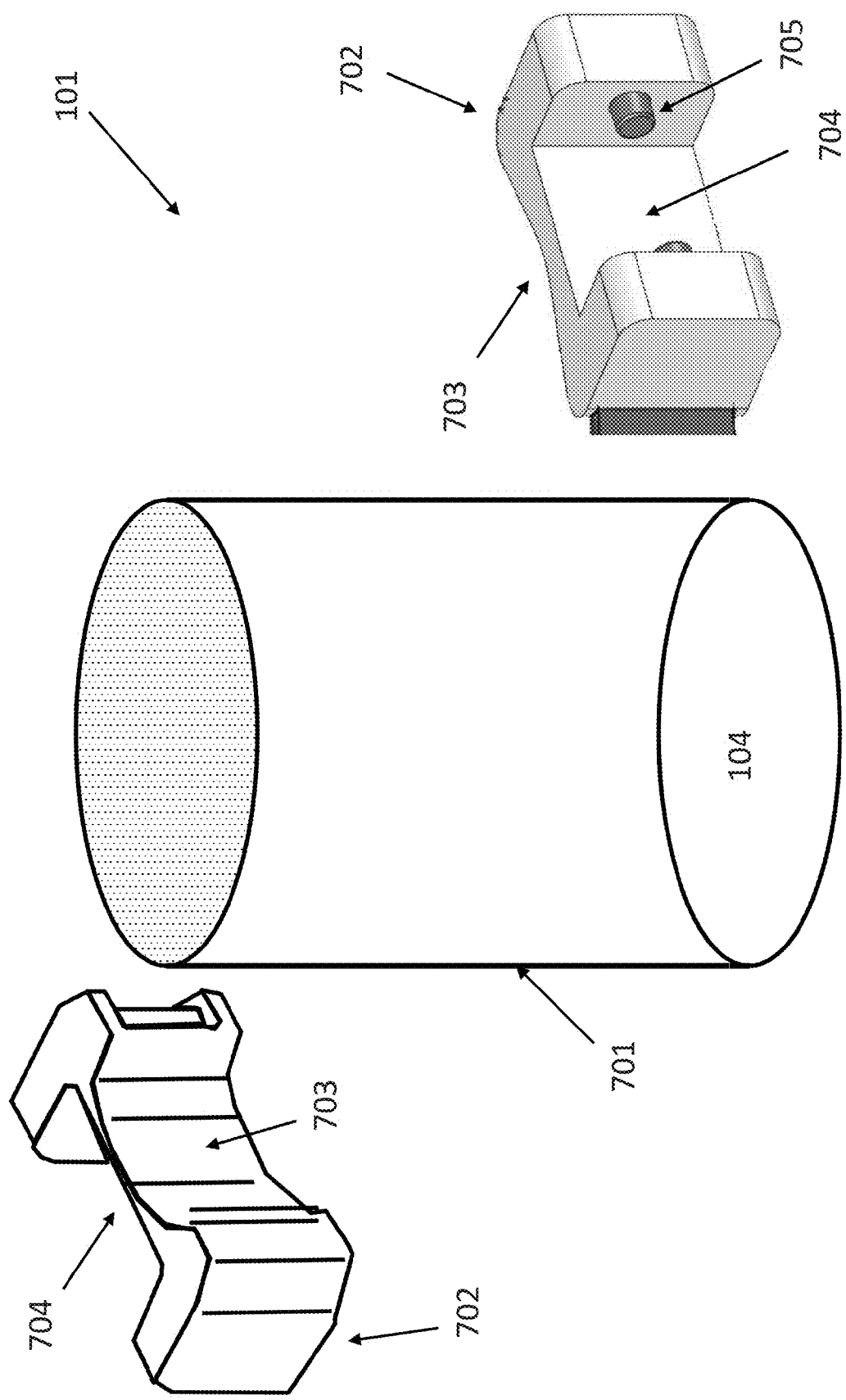
FIG. 7 illustrates one view the clamping members of the object mounting yoke, and their orientation with respect to the cylinder, in accordance with one embodiment of the present invention.

Turning to FIG. 7, in any of the above described embodiments, the object mounting yoke 101 may include a compressed gas cylinder 104 with an outside diameter 701, and two identical clamping members 702. Each clamping member may have a first side 703 configured to conform with the outside diameter 701 of the compressed gas cylinder 104, and a second side 704 configured to conform with a conveyance mounting bracket 102, and/or a user mounting bracket 103.

The second side 704 of at least one clamping member 702 may also include pins 705 which engage complementary mechanisms in the conveyance mounting bracket 102 and/or the user mounting bracket 103. The pins 705 may be spring activated or manually activated. The clamping member 702 may include hooks which engage complementary mechanisms in the conveyance mounting bracket 102 and/or the user mounting bracket 103. The hooks may be fixedly attached to cylinder (non-pivoting, non-spring activated, non-manually activated) or spring activated. The hooks may move in a radial (lateral) direction or an axial (vertical) direction.

Figure 8:
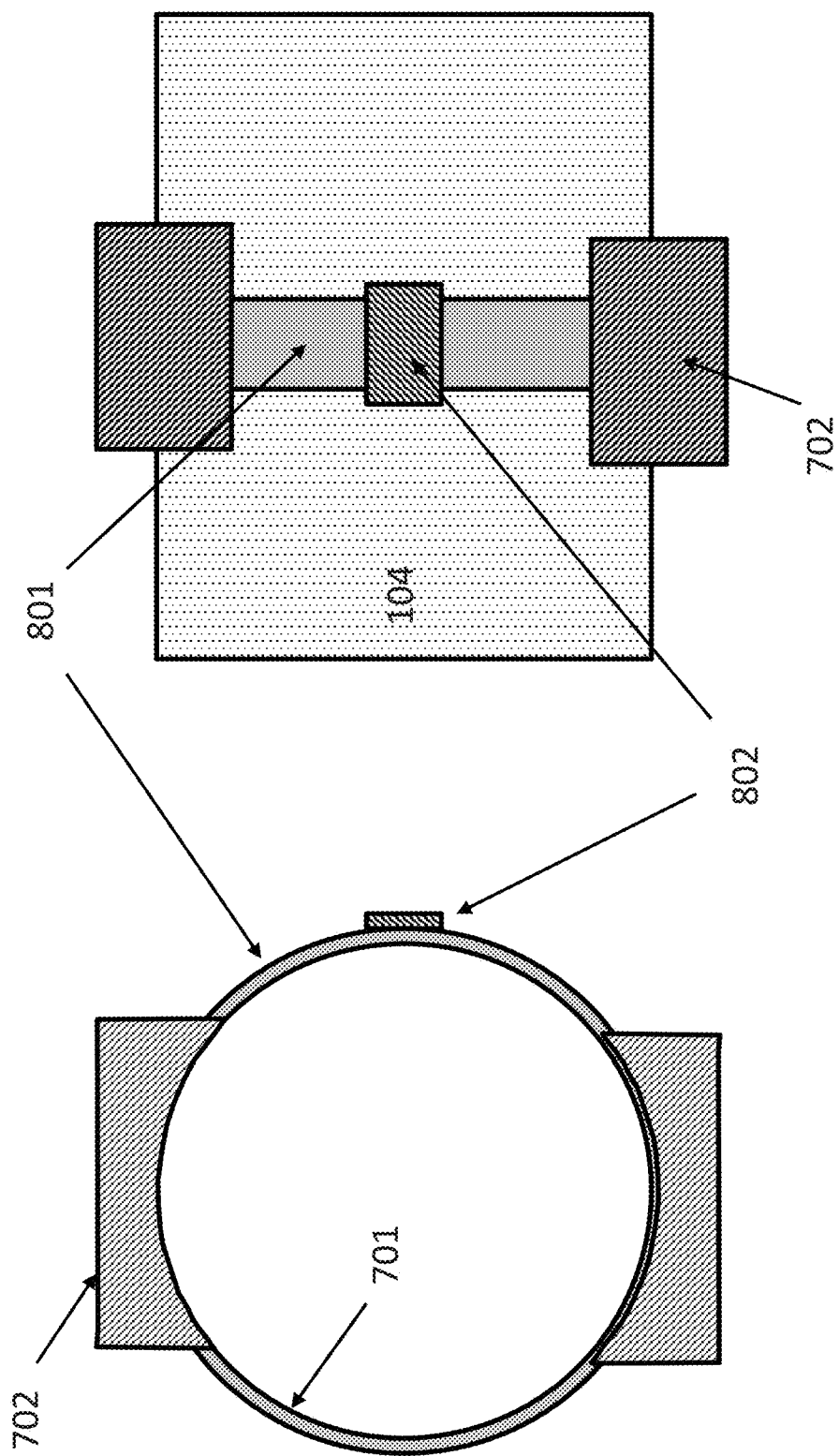
FIG. 8 illustrates another view the clamping members of the object mounting yoke, and their orientation with respect to the cylinder, in accordance with one embodiment of the present invention.

Turning to FIG. 8, in any of the above described embodiments, the clamping members 702 may be oriented so that the first side 703 of each member 702 is in contact with the outside diameter 701 of the compressed gas cylinder 104, with the clamping members diametrically opposed. There may be a means 801 for securely attaching the clamping members 702 to each other, and circumventing the compressed gas cylinder 104 thereby securely attaching the clamping members 702 to the compressed gas cylinder 104.

The means 801 for securely attaching the clamping members to each other may be a strap with a fastening apparatus 802 selected from the group consisting of a buckle, side release buckle, D rings, snaps, a carabineer, a latch, a double ended snap hook, a draw latch, and a ratcheting mechanism. The ratcheting mechanism may be selected from the group consisting of a lever and a knob. The means for securely attaching the clamping members to each other is a hook and loop strap.

Figure 9:
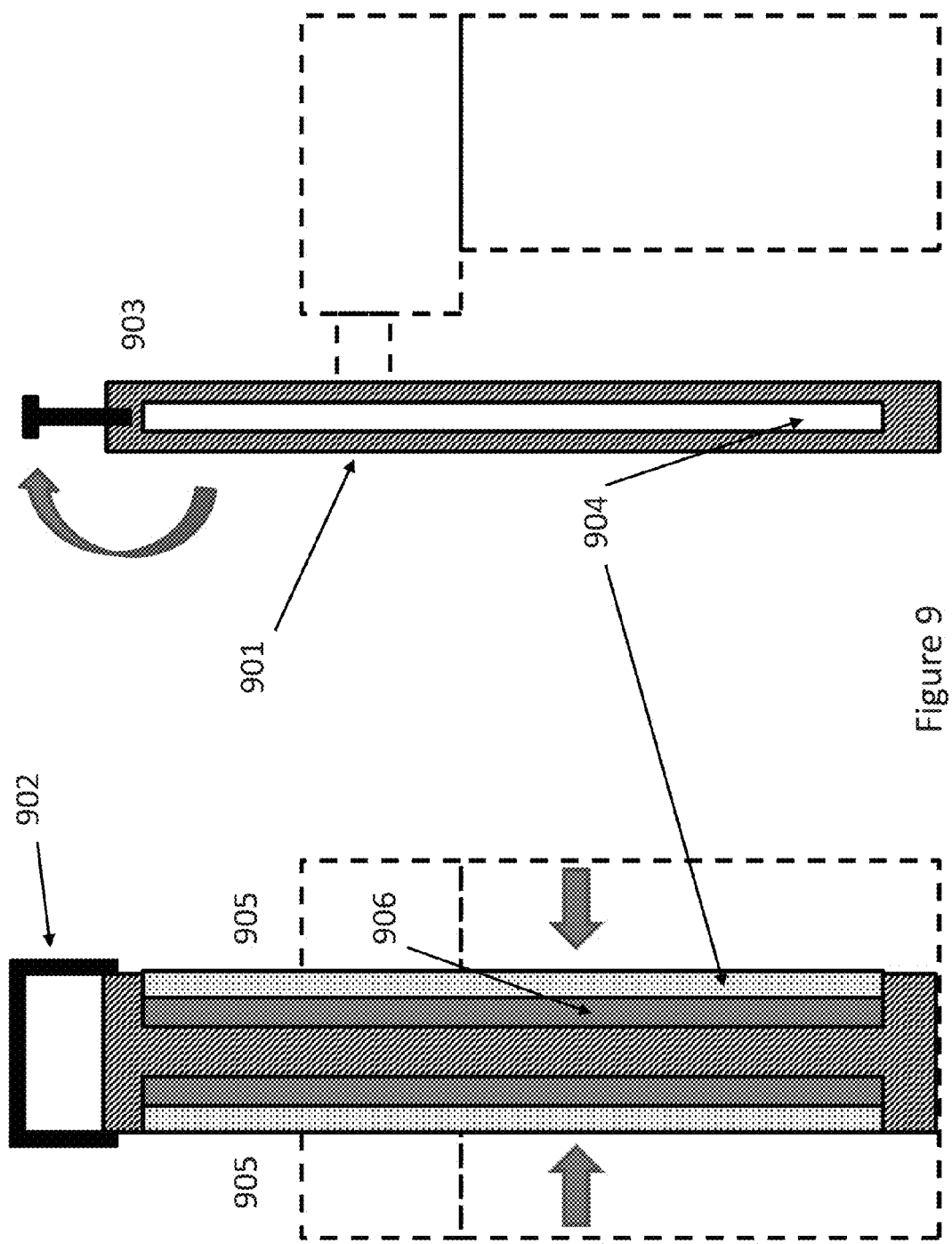
FIG. 9 illustrates one view of the elongated load bearing beam, in accordance with one embodiment of the present invention.
Figure 10:
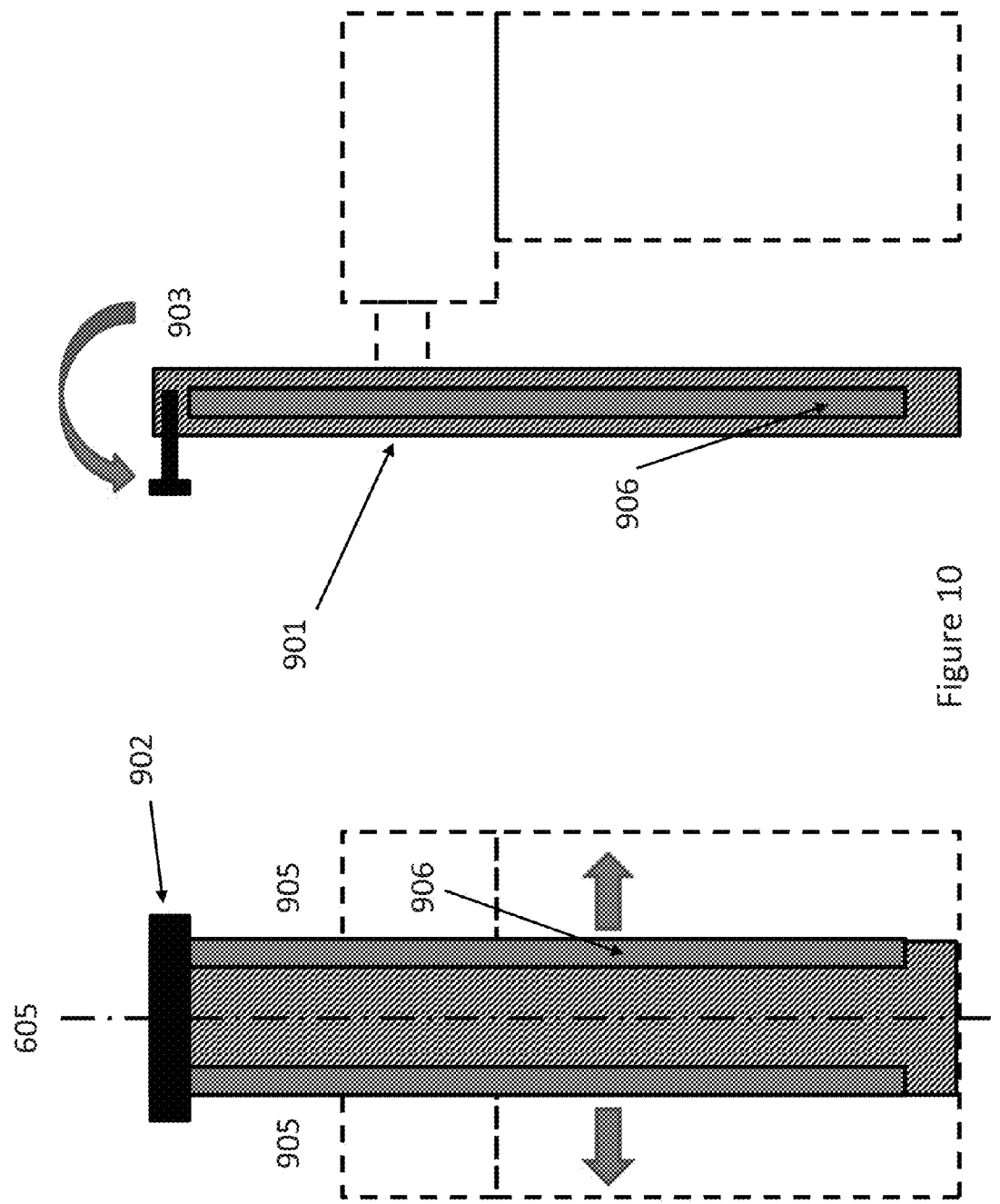
FIG. 10 illustrates another view of the elongated load bearing beam, in accordance with one embodiment of the present invention.

Turning to FIGS. 9 and 10, in any of the above described embodiments, the system may include one or more elongated load bearing beams 901. Elongated load bearing beam 901 may be used as cylinder mounting spine 201, user mounting spine 301, conveyance mounting spine 401, first cylinder mounting spine 601, or second cylinder mounting spine 602 as discussed above. The system may include a release arm 902, mounted to one end 903 of the elongated load bearing arm 901. There may be one or more slots 904 on the sides 905 of the elongated load bearing beam 901, which may be engaged by complementary spring loaded latches 705 on the object mounting yoke 101, or in some embodiments on the conveyance mounting bracket 102 and/or the user mounting bracket 103 (not shown). There may be release bars 906 mounted inside the elongated load bearing arm 901, which may be configured to move laterally upon activation by the release arm 902, thereby compressing the complementary spring loaded latches 705 on the object mounting yoke 703, or in some embodiments on the conveyance mounting bracket 102 and/or the user mounting bracket 103 (not shown) and disengaging the object mounting yoke 703 from the complementary bracket. The release arm 902 may be pivotally mounted to the elongated load bearing arm 901, and wherein pivoting the release arm 902 activates the release bars 906. FIG. 9 illustrates the attachment mechanism (in this case, elongated load bearing beams 901) in the engaged position, wherein the complementary object mounting yoke, 101 or user mounting bracket 103 would be detachably engaged.

Turning to FIG. 11, in any of the above described embodiments, the system may include a transport device 105 that includes at least four wheels 907, and may be configured as follows. During a first operating mode, all four wheels are in contact with the ground, and the elongated load bearing beam 901 is inclined in such a way that the center of gravity is between the wheels. And during a second operating mode, two wheels are in contact with the ground, and the elongated load bearing beam 901 is substantially vertical. FIG. 10 illustrates the attachment mechanism (in this case, elongated load bearing beams 901) in the disengaged position, wherein the complementary object mounting yoke, 101 or user mounting bracket 103 would be disengaged.

Turning to FIGS. 12a-12d, a compressed gas cylinder transport and mounting method 600 may be employed utilizing any of the above described embodiments. One embodiment of the method may include providing a object mounting yoke 101 that is configured to securely attach to a compressed gas cylinder 104, wherein the gas cylinder 104 has an axial centerline 603. Also providing a conveyance mounting bracket (in this case elongated load bearing beam 901) securely attached to a transport device 105, wherein the mounting bracket comprises an attachment mechanism (such as elongated load bearing beam 901) comprising a disengaged first position and an engaged second position (as described above). And wherein transport device 105 and attached conveyance mounting bracket 102 has a first centerline 604. The method may include placing the transport device 105 in the second position (FIG. 12c), with the attachment mechanism in the disengaged first position. Then aligning the axial centerline 603 with the first centerline 604 (FIG. 12b). Engaging the pins 705 of the object mounting yoke 101 with the slots 904 on the sides of the first elongated load bearing beam 901. Then placing transport device 105 in the first position (FIG. 12d), whereby the compressed gas cylinder 104 is removably connected to the transport device 105 and ready for transport.

Turning to FIGS. 13a-13c, a compressed gas cylinder transport and mounting method 700 may be employed utilizing any of the above described embodiments. This method includes moving the transport device 105 (in the first position, FIG. 13a) into place directly in front of the user mounting spine 301. The transport device 105 is then placed in the second position (FIG. 13b), with the attachment mechanism (such as elongated load bearing beam 901) in the engaged position. The axial centerline 603 is aligned with the second centerline 605, and the spring loaded latches of the object mounting yoke 101 are engaged with the slots 904 on the sides 905 of the second elongated load bearing beam 908. Then release arm 902 is engaged, thereby releasing the object mounting yoke 101 from the attachment mechanism (Elongated load bearing beam 901). The transport device 105 is placed back in first position. Now without the compressed gas cylinder 101 attached, and thereby leaving the compressed gas cylinder 101 removably connected to the user mounting spine 201.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A transport and mounting system comprising:
    an object mounting yoke, and at least one bracket selected from the group consisting of a conveyance mounting bracket, and user mounting bracket, wherein;
    the object mounting yoke is configured to attach securely to an object and to detachably interface with the conveyance mounting bracket or to detachably interface with the user mounting bracket,
wherein the object comprises a compressed gas cylinder,
wherein the object mounting yoke further comprises,
    the compressed gas cylinder comprising an outside diameter,
    a first clamping member and a second clamping member, each having
        a first side configured to conform with the outside diameter of the compressed gas cylinder,
        a second side configured to conform with a conveyance mounting bracket, for a user mounting bracket.

2. The transport and mounting system of claim 1, wherein the second side further comprises pins which engage complementary mechanisms in the conveyance mounting bracket or the user mounting bracket.

3. The transport and mounting system of claim 2, wherein the pins comprise a mechanism which is configured to allow a secure closure as a default.

4. The transport and mounting system of claim 3, wherein the pins are spring activated.

5. The transport and mounting system of claim 2, further comprising:
    the clamping members being configured such that the first side of each member is in contact with the outside diameter of the compressed gas cylinder, and
    a means for securely attaching the clamping members to each other, and circumventing the compressed gas cylinder thereby securely attaching the clamping members to the compressed gas cylinder.

6. The transport and mounting system of claim 5, wherein the clamping members are diametrically opposed.

7. The transport and mounting system of claim 5, wherein the means for securely attaching the clamping members to each other is selected from the group consisting of a bear-trap metal clamp, an elastic band, or a harness.

8. The transport and mounting system of claim 5, wherein the means for securely attaching the clamping members to each other is a strap with a fastening apparatus selected from the group consisting of a buckle, side release buckle, D rings, snaps, a carabineer, a latch, a double ended snap hook, a draw latch, and a ratcheting mechanism.

9. The transport and mounting system of claim 8, wherein the ratcheting mechanism is selected from the group consisting of a lever and a knob.

10. The transport and mounting system of claim 5, wherein the means for securely attaching the clamping members to each other is a hook and loop strap.

11. The transport and mounting system of claim 1, wherein the conveyance mounting bracket further comprises,
    a first elongated beam, configured to attach securely to a transport device,
    a first release arm,
    a set of slots on the sides of the first elongated beam, which are configured to be engaged by the complementary spring loaded latches on the cylinder mounting yoke,
    a release mechanism for disengaging the object mounting yoke from the conveyance mounting bracket.

12. The transport and mounting system of claim 11, wherein the first release arm is mounted to one end of the first elongated beam.

13. The transport and mounting system of claim 11, wherein the first release arm is mounted to one side of the first elongated beam.

14. The transport and mounting system of claim 11, wherein the first release arm is mounted to the cylinder mounting yoke.

15. The transport and mounting system of claim 11, wherein the release mechanism comprises a set of release bars mounted inside the first elongated arm, and configured to move laterally upon activation by the first release arm, thereby compressing the complementary spring loaded latches on the object mounting yoke and disengaging the object mounting yoke from the conveyance mounting bracket.

16. The transport and mounting system of claim 11, wherein the release arm is pivotally mounted to the elongated arm, and wherein pivoting the release arm activates the release bars.

17. The transport and mounting system of claim 11, wherein the transport device comprises at least four wheels, and configured such that:
   during a first operating mode, all four wheels are in contact with the ground, and the elongated beam is inclined in such a way that the center of gravity is between the wheels, and
   during a second operating mode, two wheels are in contact with the ground, and the elongated beam is substantially vertical.

18. The transport and mounting system of claim 1, wherein the user mounting bracket further comprises,
   a second elongated beam, configured to attach securely to a workspace,
   a second release arm, mounted to one end of the second elongated arm,
   slots on the sides of the second elongated beam, which are engaged by complementary spring loaded latches on the object mounting yoke,
   a release mechanism for disengaging the object mounting yoke from the user mounting bracket.

19. The transport and mounting system of claim 18, wherein the first release arm is mounted to one end of the first elongated beam.

20. The transport and mounting system of claim 18, wherein the first release arm is mounted to one side of the first elongated beam.

21. The transport and mounting system of claim 18, wherein the first release arm is mounted to the cylinder mounting yoke.

22. The transport and mounting system of claim 18, wherein the release mechanism comprises a set of release bars mounted inside the second elongated arm, and configured to move laterally upon activation by the second release arm, thereby compressing the complementary spring loaded latches on the object mounting yoke and disengaging the object mounting yoke from the user mounting bracket.

23. The transport and mounting system of claim 18, wherein the second release arm is pivotally mounted to the second elongated arm, and wherein pivoting the second release arm activates the release bars.

24. The transport and mounting system of claim 1, wherein the user mounting bracket further comprises:
   a maximum object mounting yoke height, and
   a minimum object mounting yoke height,
   wherein the object mounting yoke is configured to detachably interface with the user mounting bracket at any point between the first minimum object mounting yoke height and the first maximum object mounting yoke height.

25. The transport and mounting system of claim 24, wherein the conveyance mounting bracket is configured to detachably interface with the object mounting yoke, when the object mounting yoke is positioned at any point between the first minimum object mounting yoke height and the first maximum object mounting yoke height.

* * * * *